June 19, 1928.

L. H. DAVIS

CLUTCH

Filed March 15, 1926

1,673,867

Inventor
Lewis H. Davis
By Spencer Sewall and Hardman
his Attorneys.

Patented June 19, 1928.

1,673,867

UNITED STATES PATENT OFFICE.

LEWIS H. DAVIS, OF ANDERSON, INDIANA, ASSIGNOR, BY MESNE ASSIGNMENTS, TO DELCO-REMY CORPORATION, OF DAYTON, OHIO, A CORPORATION OF DELAWARE.

CLUTCH.

Application filed March 15, 1926. Serial No. 94,670.

This invention relates to overrunning or one-way clutches and particularly to the type of clutch which includes an outwardly expanding helical clutch spring adapted to grip the interior cylindrical surface of a clutch drum in order to frictionally engage and receive or transmit motion to the same.

One of the objects of the present invention is to properly lubricate the friction clutch surfaces and to prevent dirt and other foreign substances from coming into contact with them.

Further objects and advantages of the present invention will be apparent from the following description, reference being had to the accompanying drawings, wherein a preferred form of embodiment of the invention is clearly shown.

Figure 1:
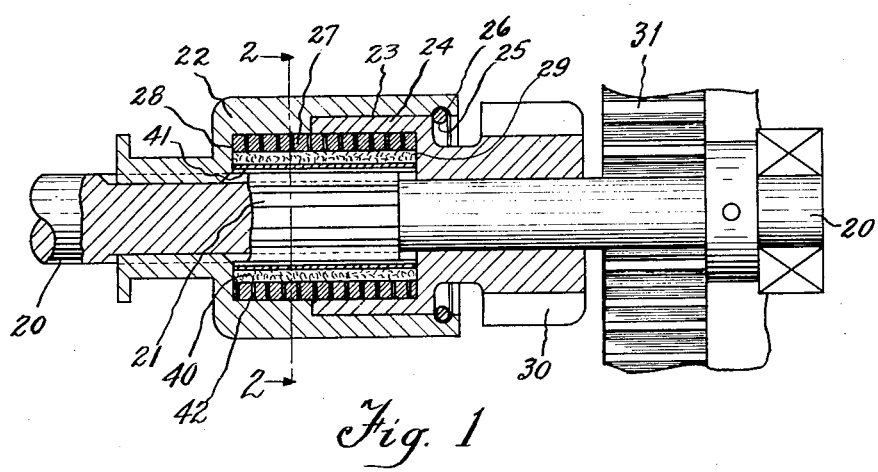
Fig. 1 is a longitudinal sectional view of a friction spring clutch including the present invention.
Figure 2:
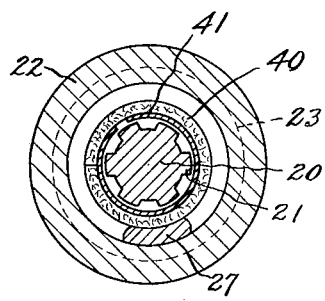
Fig. 2 is a sectional view on the line 2—2 of Fig. 1.

In the drawing, 20 designates a shaft having splines 21 with which a clutch drum 22 is slidably connected. The drum 22 is provided with a tubular recess 23 which receives a companion clutch drum 24. The interior cylindrical surfaces of the drums 22 and 24 are in alignment and are of the same diameter. The drum 24 is retained within the drum 22 by a wire split ring 25 which engages an annular groove 26 provided by the drum 22. The interior cylindrical surfaces of the drums 22 and 24 are engaged by the exterior spiral surface of a helical coil spring 27 which is retained between the end surfaces 28 and 29 respectively of the clutch drums 22 and 24. By suitable mechanism, not shown, the clutch may be moved bodily endwise along the shaft 20 in order to cause a gear 30, formed integrally with the clutch drum 24, to mesh with a gear 31 to be driven. This type of mechanism is especially adapted for connecting an electric motor with an internal combustion engine to be started, although it is susceptible of many other applications. The shaft 20 is operated by the electric motor and the gear 31 may be the engine flywheel gear. By suitable pedal operated mechanism the clutch and gear 30 are moved together endwise so that the motor will be connected with the engine. The current is supplied to the motor to cause the shaft to rotate in such a direction that the clutch members 22 and 24 will be connected. The relation between the direction of rotation of the shaft 20 and the manner in which the coil 27 is wound is such that as soon as the member 22 begins to rotate it will tend to expand the clutch spring 27 due to its frictional engagement with one end of the spring. As soon as the spring tends to unwind it will grip firmly the internal clutching surfaces of the members 22 and 24 and thus drive the gear 30. Where the apparatus is applied to an engine starter, as soon as the engine becomes self operative, it will drive the gear 30 under its own power and in the same direction as the gear 30 was operated by the electric motor. Since the gear 30 is operated by the engine at a greater speed than it is operated by the electric motor for driving the shaft 20, the clutch member 24 will overrun the clutch spring 27. This will occur because greater relative rotation of the clutch member 24 will tend to cause the spring 27 to contract and to be relieved from its gripping engagement with the clutch drums 22 and 24.

In order to lubricate the clutch surfaces and prevent dirt from coming into contact with them, the present invention provides a tube or internal wrapping of fibrous lubricant absorbing material such as felt referred to by numeral 40. This tubular felt strip is yieldingly pressed into engagement with the convolutions of the spring 27 by a resilient split tube 41. Lubricant may flow from the oil absorbent felt pad 40 through the narrow spiral crevices 42 between the turns of coil 27. Thus the spring operates as a wick to transmit oil from the felt pad to the frictional surfaces of the clutch. The pad also functions to prevent particles of dirt and gritty substances from coming into contact with the frictional surfaces of the clutch and scratching these surfaces so that a smooth overrunning action of the clutch might be interfered with.

While the form of embodiment of the present invention as herein disclosed, constitutes a preferred form, it is to be understood that other forms might be adopted, all coming within the scope of the claims which follow.

What is claimed is as follows:

1. A clutch comprising in combination, an outwardly expanding helical clutch spring;

a clutch drum engaged internally by the spring; and lubricating means within said spring, comprising a tube of felt yieldingly urged against the spring by a tubular spring member.

2. A clutch comprising in combination, a driving member having a recessed portion of different diameters; a driven member having a recessed portion fitting into the larger diameter recess of the driving member, the smaller diameter recess of the driving member and the recess of the driven member being of equal dimensions and in alignment, forming a cylindrical chamber within the clutch; means carried by the driving member for retaining the driven member; an outwardly expansible, helical spring fitting within the said chamber the ends of the spring frictionally engaging the ends of the chamber respectively; a lining of lubricant absorbing material on the inside of the spring; and a resilient tubular member in said lining for yieldingly urging the lining against the inner surface of the spring.

In testimony whereof I hereto affix my signature.

LEWIS H. DAVIS.